United States Patent
Kim et al.

(10) Patent No.: US 9,842,588 B2
(45) Date of Patent: Dec. 12, 2017

(54) METHOD AND DEVICE FOR CONTEXT-BASED VOICE RECOGNITION USING VOICE RECOGNITION MODEL

(71) Applicant: Samsung Electronics Co., Ltd., Suwon-si (KR)

(72) Inventors: Hyun-Jun Kim, Osan-si (KR); Young Sang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/616,501

(22) Filed: Feb. 6, 2015

(65) Prior Publication Data

US 2016/0019887 A1    Jan. 21, 2016

(30) Foreign Application Priority Data

Jul. 21, 2014  (KR) .................. 10-2014-0091769

(51) Int. Cl.
| | |
|---|---|
| *G10L 15/00* | (2013.01) |
| *G10L 15/08* | (2006.01) |
| *G10L 15/183* | (2013.01) |
| G10L 15/22 | (2006.01) |
| G10L 15/197 | (2013.01) |

(52) U.S. Cl.
CPC ............ *G10L 15/08* (2013.01); *G10L 15/183* (2013.01); *G10L 15/197* (2013.01); *G10L 2015/228* (2013.01)

(58) Field of Classification Search
CPC ................. G10L 15/183; G10L 2015/228

USPC .................................. 704/251, 255
See application file for complete search history.

(56) References Cited

U.S. PATENT DOCUMENTS

| | | | | |
|---|---|---|---|---|
| 7,162,422 B1* | 1/2007 | Bennett | ............... | G10L 15/08 |
| | | | | 704/236 |
| 7,228,275 B1* | 6/2007 | Endo | .............. | G10L 15/32 |
| | | | | 704/231 |
| 8,332,218 B2* | 12/2012 | Cross, Jr. | .............. | 704/231 |
| 2002/0087311 A1* | 7/2002 | Leung Lee | ........... | G06Q 30/06 |
| | | | | 704/251 |
| 2002/0091522 A1* | 7/2002 | Bi | ................ | G10L 15/12 |
| | | | | 704/246 |
| 2003/0144837 A1* | 7/2003 | Basson | ............. | G10L 15/32 |
| | | | | 704/231 |

(Continued)

FOREIGN PATENT DOCUMENTS

| | | |
|---|---|---|
| JP | 2006-106300 A | 4/2006 |
| JP | 2013-250490 A | 12/2013 |

(Continued)

*Primary Examiner* — Shaun Roberts
(74) *Attorney, Agent, or Firm* — NSIP Law (57) ABSTRACT

A method and a device of voice recognition are provided. The method involves receiving a voice signal, identifying a first voice recognition model in which context information associated with a situation at reception of the voice signal is not reflected and a second voice recognition model in which the context information is reflected, determining a weighted value of the first voice recognition model and a weighted value of the second voice recognition model, and recognizing a word in the voice signal by applying the determined weighted values to the first voice recognition model and the second voice recognition model.

22 Claims, 6 Drawing Sheets

(56) References Cited

U.S. PATENT DOCUMENTS

| | | | | |
|---|---|---|---|---|
| 2004/0102971 | A1* | 5/2004 | Lipscher | G06F 17/279 704/236 |
| 2005/0049880 | A1* | 3/2005 | Roth | G10L 15/22 704/277 |
| 2005/0080632 | A1* | 4/2005 | Endo | G10L 15/08 704/277 |
| 2005/0182628 | A1* | 8/2005 | Choi | G10L 15/08 704/252 |
| 2009/0138265 | A1* | 5/2009 | Willett | G10L 15/30 704/251 |
| 2010/0070277 | A1 | 3/2010 | Arakawa et al. | |
| 2013/0138440 | A1* | 5/2013 | Strope | G10L 15/32 704/240 |
| 2014/0337007 | A1* | 11/2014 | Waibel | G06F 17/289 704/3 |
| 2014/0337032 | A1* | 11/2014 | Aleksic | G10L 15/32 704/257 |
| 2015/0325236 | A1* | 11/2015 | Levit | G10L 15/18 704/240 |

FOREIGN PATENT DOCUMENTS

| | | |
|---|---|---|
| KR | 10-2006-0067096 A | 6/2006 |
| KR | 10-2011-0032394 A | 3/2011 |
| KR | 10-2011-0114797 A | 10/2011 |
| KR | 10-2012-0078368 A | 7/2012 |
| KR | 10-2012-0079342 A | 7/2012 |
| KR | 10-2013-0021136 A | 3/2013 |
| KR | 10-2013-0068624 A | 6/2013 |

\* cited by examiner

METHOD AND DEVICE FOR CONTEXT-BASED VOICE RECOGNITION USING VOICE RECOGNITION MODEL

CROSS-REFERENCE TO RELATED APPLICATION

This application claims the benefit under 35 USC 119(a) of Korean Patent Application No. 10-2014-0091769 filed on Jul. 21, 2014, in the Korean Intellectual Property Office, the entire disclosure of which is incorporated herein by reference for all purposes.

BACKGROUND

1. Field

The following description relates to a method and a device for performing voice recognition using context information.

2. Description of Related Art

Development of voice recognition technology has led to an increasing use of voice related applications in various devices. The voice recognition technology may be applied to, for example, device control, Internet searches, dictation of memos and messages, and language study. Such commercial applications are provided to smart devices.

However, technical limitations in, for example, accuracy in recognition, may inhibit further expansion of applying the voice recognition technology to more fields. For example, isolating a language including commands has been be mainly used for voice recognition in lieu of sentences and inquiries. To increase the accuracy in recognition, a conventional method of training an acoustic model and a language model in information collected from unspecified sources may be used. However, a considerable difference in speech expression characteristics among various users may restrict construction of an overall model and thus, an optimal performance may not be easily achieved from the voice recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of voice recognition involves receiving a voice signal, identifying a first voice recognition model in which context information associated with a situation at reception of the voice signal is not reflected and a second voice recognition model in which the context information is reflected, determining a weighted value of the first voice recognition model and a weighted value of the second voice recognition model, and recognizing a word in the voice signal by applying the determined weighted values to the first voice recognition model and the second voice recognition model.

The identifying of the second voice recognition model may be performed based on the context information including at least one of environmental information and user profile information at reception of the voice signal.

The environmental information may include at least one of time at reception of the voice signal, weather at reception of the voice signal, location of a voice recognition device receiving the voice signal, and a moving speed of a voice recognition device receiving the voice signal.

The user profile information may include at least one of a gender, an age, a hometown, a hobby, and a marital status of a user.

The first voice recognition model and the second voice recognition model may include respective acoustic models and language models, and the recognizing of the word in the voice signal may involve determining at least one syllable comprised in the voice signal by using a phoneme probability based on an acoustic model of the first voice recognition model and a phoneme probability based on an acoustic model of the second voice recognition model, and recognizing a word comprising the at least one syllable by using a word probability based on a language model of the first voice recognition model and a word probability based on a language model of the second voice recognition model.

The recognizing of the word in the voice signal further involve recognizing a word subsequent to the recognized word by using a word probability based on the language model of the first voice recognition model and a word probability based on the language model of the second voice recognition model.

The recognizing of the word in the voice signal may be performed by applying, to an n-gram language model, the first voice recognition model and the second voice recognition model for which the weighted values are determined The determining of the weighted values may be performed based on a weighted value applied to a word recognized prior to a word being recognized.

In another general aspect, a method of voice recognition involves receiving a voice signal, verifying context information comprising at least one of environmental information and user profile information at reception of the voice signal, determining a weighted value of a first voice recognition model in which the context information is not reflected and a weighted value of a second voice recognition model in which the context information is reflected based on the context information, and recognizing a word in the voice signal by applying the determined weighted values to the first voice recognition model and the second voice recognition model and applying, to an n-gram language model, the first voice recognition model and the second voice recognition model to which the determined weighted values are applied.

The first voice recognition model and the second voice recognition model may include respective acoustic models and language models, and the recognizing of the word in the voice signal may involve determining at least one syllable comprised in the voice signal by using a phoneme probability based on an acoustic model of the first voice recognition model and a phoneme probability based on an acoustic model of the second voice recognition model, and recognizing a word comprising the at least one syllable by using a word probability based on a language model of the first voice recognition model and a word probability based on a language model of the second voice recognition model.

The recognizing of the word in the voice signal further involves recognizing a word subsequent to the recognized word by using a word probability based on the language model of the first voice recognition model and a word probability based on the language model of the second voice recognition model.

In another general aspect, a non-transitory computer-readable storage medium includes a program including instructions to cause a computer to perform the method described above.

In another general aspect, a voice recognition device includes a receiver configured to receive a voice signal, a voice recognition model identifier configured to identify a first to voice recognition model in which context information associated with a situation at reception of the voice signal is not reflected and a second voice recognition model in which the context information is reflected, a weighed value determiner configured to determine a weighted value of the first voice recognition model and a weighted value of the second voice recognition model, and a word recognizer configured to recognize a word in the voice signal by applying the determined weighted values to the first voice recognition model and the second voice recognition model.

The voice recognition model identifier may be configured to identify the second voice recognition model based on the context information comprising at least one of environmental information and user profile information at reception of the voice signal.

The environmental information may include at least one of time at reception of the voice signal, weather at reception of the voice signal, location of the voice recognition device receiving the voice signal, and a moving speed of the voice recognition device receiving the voice signal.

The user profile information may include at least one of a gender, an age, a hometown, a hobby, and a marital status of a user.

The first voice recognition model and the second voice recognition model may include respective acoustic models and language models, and the word recognizer may be configured to determine at least one syllable comprised in the voice signal by using a phoneme probability based on an acoustic model of the first voice recognition model and a phoneme probability based on an acoustic model of the second voice recognition model, and recognize a word comprising the at least one syllable by using a word probability based on a language model of the first voice recognition model and a word probability based on a language model of the second voice recognition model.

The word recognizer may be configured to further recognize a word subsequent to the recognized word by using a word probability based on the language model of the first voice recognition model and a word probability based on the language model of the second voice recognition model.

The word recognizer may be configured to recognize the word in the voice signal by applying, to an n-gram language model, the first voice recognition model and the second voice recognition model for which the weighted values are determined.

The weighted value determiner may be configured to determine the weighted values of the first voice recognition model and the second voice recognition model based on a weighted value applied to a word recognized prior to a word desired to be recognized.

In another general aspect, a device for voice recognition may include a microphone configured to receive a voice signal, a word recognizer configured to recognize a word in the voice signal by applying weighted values to candidate words, the weighted values obtained by determining context information of the device at the time the voice signal is received, and a command identifier configured to identify a user command based on the recognized word.

The general aspect of the device may further include a voice recognition model identifier configured to identify a first voice recognition model in which context information associated with a situation at reception of the voice signal is not reflected and a second voice recognition model in which the context information is reflected.

The general aspect of the device may further include a weighed value determiner configured to determine a weighted value of the first voice recognition model and a weighted value of the second voice recognition model, wherein the word recognizer may be configured to recognize the word in the voice signal by applying the determined weighted values to the first voice recognition model and the second voice recognition model.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
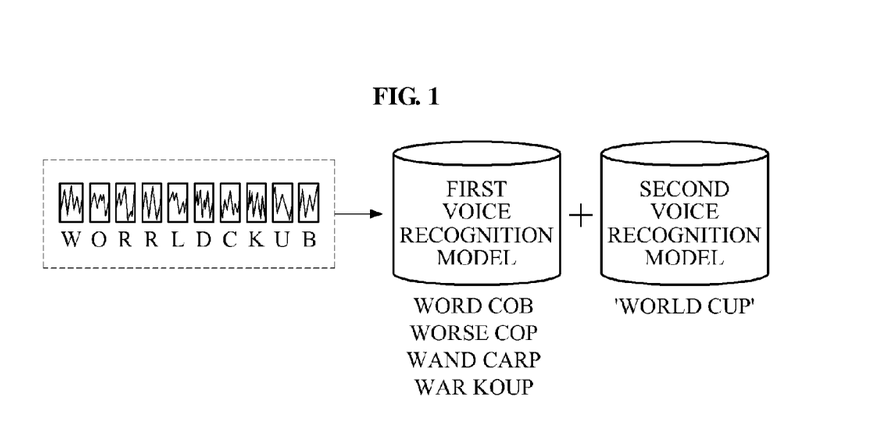
FIG. 1 is a diagram illustrating an example of a method of performing voice recognition using a voice recognition model in which context information is reflected.

FIG. 1 is a diagram illustrating an example of a method of performing voice recognition using a voice recognition model in which context information is reflected.

FIG. 1 illustrates an example in which a user expresses a voice signal, for example, "world cup," and the voice signal is received by a voice recognition device. When the user does not accurately pronounce the voice signal or a significant amount of noise is present in the voice signal, the voice recognition device may recognize the voice signal as an unintended word. In other words, the accuracy of the voice recognition device may suffer. For example, the voice recognition device may erroneously recognize the voice signal as, for example, "word cob," "worse cop," "wand carp," "war cob," and the like.

However, if the voice recognition device is able to use a fact that a time at which the user expresses the voice signal is a period during which interest in an event such as a world cup is greatest, for example, a time immediately prior to opening of the world cup, the accuracy of the voice recognition device may be improved by more easily recognizing words such as "world cup" in the voice signal. Concisely, the accuracy of the voice recognition device may be improved if the voice recognition device recognizes a voice signal by performing voice recognition using context information.

The context information may refer to information regarding an event or occurrence that is taking place at the time the voice signal is received from the user. For example, the context information may include environmental information and user profile information. The environmental information may include various sets of information indicating an environment in which the user is expressing the voice signal. For example, information on time and weather at the time the voice signal is received, a location of the voice recognition device, a speed at which the voice recognition device is moving when the voice signal is received by the voice recognition device. The user profile information may include various sets of information on the user expressing the voice signal, for example, information on a gender, an age, a hometown, a hobby, and a marital status of the user.

The voice recognition device may perform the voice recognition using the context information and a voice recognition model. The voice recognition model may be a database to which the voice recognition device is referred in order to recognize the voice signal as a word, and in which numerous reference vectors and text including, for example, a phoneme, a syllable, and a word corresponding to each reference vector are stored. The voice recognition device may extract a feature vector from a received voice signal, match the extracted feature vector to the reference vectors included in the voice recognition model, and recognize the voice signal as text including a phoneme, a syllable, a word, and the like.

A general voice recognition model may simply include the reference vectors and words, but not reflect the context information. For ease of description, the general voice recognition model in which the context information is not reflected will be hereinafter referred to as a "first voice recognition model."

As described in the foregoing, the voice recognition device may perform voice recognition using the voice recognition model in which the context information is reflected. The voice recognition model in which the context information is reflected may include various models indicating a situation in which the voice recognition device receives a voice signal from a user, for example, a time model reflecting a time when the voice signal is received, a weather model reflecting weather at reception of the voice signal, a location model reflecting a location of the voice recognition device receiving the voice signal, a moving speed model reflecting a moving speed of the voice recognition device receiving the voice signal, a gender model reflecting a gender of the user expressing the voice signal, an age model reflecting an age of the user, a hometown model, a hobby model, a marital status model, and the like. For ease of description, the voice recognition model in which the context information is reflected will be hereinafter referred to as a "second voice recognition model."

Figure 2:
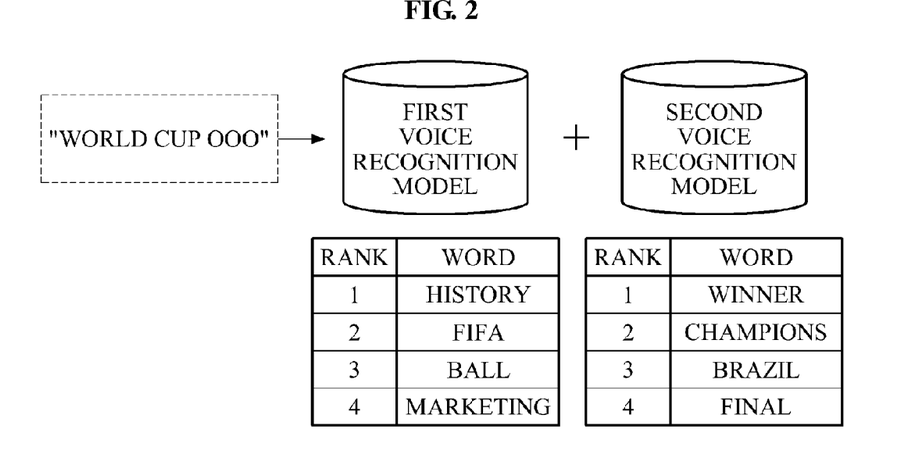
FIG. 2 is a diagram illustrating another example of a method of performing voice recognition using a voice recognition model in which context information is reflected.

FIG. 2 is a diagram illustrating another example of performing voice recognition using a voice recognition model in which context information is reflected.

Dissimilar to the example illustrated in FIG. 1 in which a voice signal expressed by a user is unclearly recognized, FIG. 2 illustrates an example in which only a portion of the voice signal expressed by the user is unclearly recognized.

Referring to the example of FIG. 2, the user expresses a voice signal, for example, "world cup OOO," and a voice recognition device clearly recognizes words "world cup," but not "OOO" which immediately follows the recognized words.

In the event that a voice recognition device exclusively uses a first voice recognition model in which context information is not reflected, the voice recognition device may recommend candidate words obtained based on statistical data collected offline as the word "OOO" corresponding to an unclearly recognized voice signal. Conversely, in the event that a voice recognition device uses a second voice recognition model in which the context information is reflected is used, the voice recognition device may preferentially recommend a result of reflecting the context information. For example, the context information may include a time and a location at which the voice signal is expressed. The result of reflecting the context information may include "winner," "champions," "Brazil," "final," and the like. Thus, by using the second voice recognition model in which the context information is reflected, it may be possible to increase a probability that the voice recognition device recommends more suitable words depending on the need of the user.

In another example, the user may express a voice signal, for example, "Starbucks OOO," and the voice recognition device may unclearly recognize a word "OOO" subsequent to "Starbucks."

In the event that a voice recognition device that exclusively uses the first voice recognition model in which context information is not reflected is used, the voice recognition device may recommend a word "coffee" anticipated based on statistical data collected offline as the word "OOO" corresponding to an unclearly recognized voice signal. Conversely, in the event that a voice recognition device that uses the second voice recognition model in which such context information is reflected is used, and a location at which the user expresses the voice signal is a brokerage firm and a keyword relating to an operating profit of Starbucks occupies a higher spot in a keyword rank, the voice recognition device may preferentially recommend words, for example, "stock," "share," and "stock price," obtained by reflecting the context information as the word "OOO" in lieu of the generally anticipated word "coffee." Herein, "preferentially" indicates that additional weights may be given for a group of candidate words. For example, a numerical value may be added to a value representing the likelihood that the received sound corresponds to a candidate word.

In still another example, the user may express a voice signal, for example, "television OOO," in the evening, and the voice recognition device may unclearly recognize a word "OOO" subsequent to "television."

When the first voice recognition model in which context information is not reflected is used, the voice recognition device may recommend a word, for example, "brand" and "price" anticipated based on statistical data collected offline. Conversely, when the user is a middle-aged man and the user expresses the voice signal in the morning, the voice recognition device may preferentially recommend words, for example, "news" and "sport" obtained by reflecting the context information as the word "OOO" in lieu of the generally anticipated words using the second voice recognition model. Alternatively, when the user is a middle-aged woman and the user expresses the voice signal in the evening, the voice recognition device may preferentially recommend a word, for example, "drama," obtained by reflecting the context information as the word "OOO" using the second voice recognition model.

Figure 3:
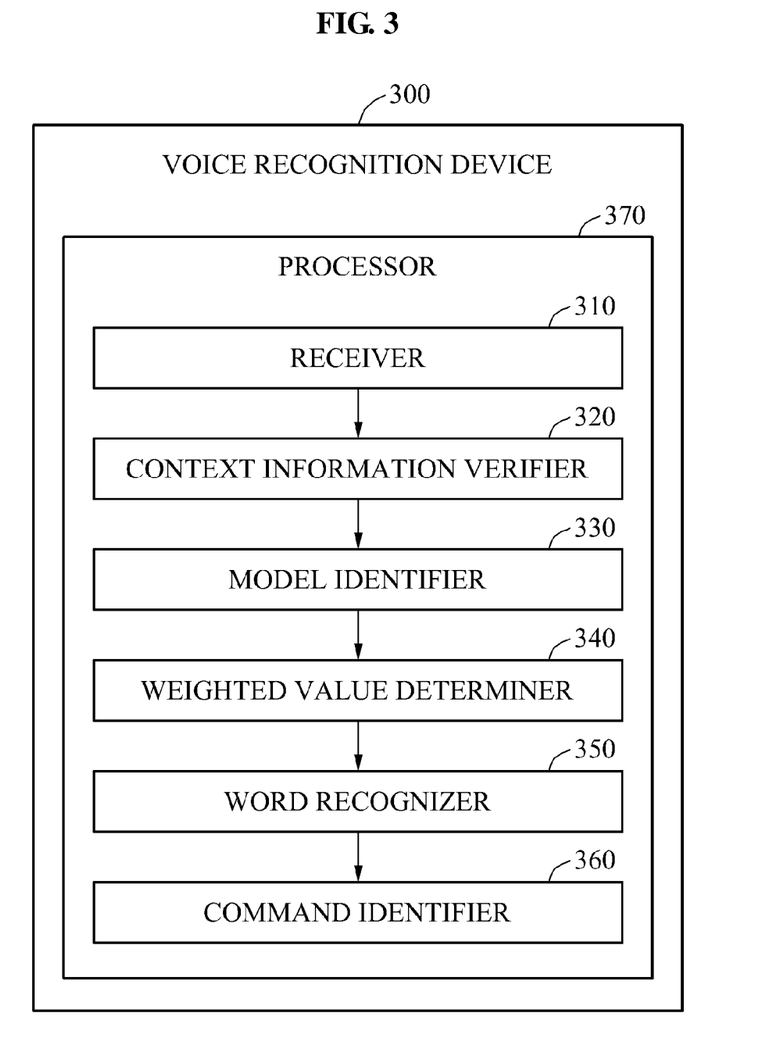
FIG. 3 is a diagram illustrating an example of a voice recognition device.

FIG. 3 is a diagram illustrating an example of a voice recognition device 300.

Referring to FIG. 3, the voice recognition device 300 includes a receiver 310, a context information verifier 320, a model identifier 330, a weighted value determiner 340, a word recognizer 350, and a command identifier. In this example, the context information verifier 320, the model identifier 330, the weighted value determiner 340, the word recognizer 350 and the commend identifier 360 are implemented within a processor 370; however, the voice recognition device is not limited thereto.

The receiver 310 receives a voice signal from a user. For example, the receiver 310 may receive the voice signal expressed by the user through an input device, for example, a microphone.

The context information verifier 320 verifies context information. The context information refers to information on a situation at the time a voice signal is received from the user. For example, the context information may include environmental information and user profile information.

The environmental information may include various sets of information on an environment in which the user expressing the voice signal is present. For example, the environmental information may include information regarding the time and the weather condition at the time the voice signal is received, a location of the voice recognition device 300 and a speed by which the voice recognition device 300 is moving when the voice signal is received. For example, the time at which the voice signal is received may be verified based on the time set in the voice recognition device 300 receiving the voice signal. Also, the location of the voice recognition device 300 receiving the voice signal may be verified using a position locator such as a global positioning system (GPS) receiver of the voice recognition device 300. For example, when the user sets a location as "home" and the location obtained through the GPS receiver is within a range from the set location "home," the voice recognition device 300 may verify the location of the voice recognition device 300 to be "home."

The user profile information may include various sets of information regarding the user that is expressing the voice signal. For example, the user profile information may include information regarding gender, age, hometown, hobby, and marital status of the user. For example, the gender of the user who is producing the voice signal may be indicated as a value pre-input from the user to the voice recognition device 300 or determined by the voice recognition device 300 based on a frequency of the received voice signal. The age of the user may also be indicated as a value pre-input from the user to the voice recognition device 300 or determined by the voice recognition device 300 based on the received voice signal. The hometown, hobby, and marital status of the user may be indicated as values pre-input from the user.

The model identifier 330 identifies a first voice recognition model in which the context information is not reflected and a second voice recognition model in which the context information is reflected. For example, the model identifier 330 identifies the second voice recognition model based on the context information including at least one of the environmental information and the user profile information.

For example, when information on the location is not verified based on the context information verified by the context information verifier 320, the model identifier 330 may not identify a location model from the second voice recognition model. Conversely, in the event that information regarding time is verified based on the context information, the model identifier 330 may identify a time model from the second voice recognition model.

The weighted value determiner 340 determines a weighted value of the first voice recognition model and a weighted value of the second voice recognition model.

In an example, the weighted value determiner 340 may determine the respective weighted values of the first voice recognition model and the second voice recognition model based on the context information verified by the context information verifier 320. For example, in response to information on the gender not being verified based on the context information, the weighted value determiner 340 may set a weighted value of a gender model of the second voice recognition model to be "0." Similarly, in response to information on the location, for example, "home," being verified based on the context information, the weighted value determiner 340 may set a weighted value of the location model of the second voice recognition model to be higher than other voice recognition models.

In another example, in response to a portion of a received voice signal being less clear, the weighted value determiner 340 may determine a weighted value of the unclearly recognized portion, for example, a word, based on a weighted value of a previously recognized word prior to the unclearly recognized word. For example, in the event that a voice signal comprising a first word and a second word is received and the portion of the received voice signal ("first word, second word") corresponding to the second word is unclearly recognized, respective weighted values of the first voice recognition model and the second voice recognition model used to recognize the first word may be determined to be respective weighted values of the first voice recognition model, and the second voice recognition model may be used to recognize the portion corresponding to the second word.

The word recognizer 350 recognizes a word included in the voice signal based on the first voice recognition model and the second voice recognition model for which the weighted values are determined. The first voice recognition model and the second voice recognition model include respective acoustic models and language models.

An acoustic model may refer to a model used to recognize a voice signal based on a unit of a phoneme. The word recognizer 350 determines the voice signal as at least one syllable by recognizing the voice signal based on the unit of a phoneme using the acoustic model.

A phoneme may be a smallest unit in phonology that has a function of distinguishing a meaning of a word. For example, an alphabet may have 49 or 61 phonemes.

A language model may refer to a model used to recognize a word based on at least one syllable or recognize a word subsequent to a recognized word based on the recognized word. The word recognizer 350 recognizes the word included in the voice signal based on the at least one syllable determined using the acoustic model. In addition, the word recognizer 350 recognizes a word subsequent to the recognized word using the language model.

The word recognizer 350 calculates a first phoneme probability using the acoustic model of the first voice recognition model and a second phoneme probability using the acoustic model of the second voice recognition model. The word recognizer 350 determines the at least one syllable included in the voice signal based on the calculated first phoneme probability and the calculated second phoneme probability.

In addition, the word recognizer 350 calculates a first word probability using the language model of the first voice recognition model and a second word probability using the language model of the second voice recognition model. The word recognizer 350 recognizes a word including the at least one syllable based on the calculated first word probability and the calculated second word probability.

In response to a portion of a voice signal expressed by the user, for example, a word subsequent to a recognized word, is unclearly recognized, the word recognizer 350 may further recognize the word subsequent to the recognized word based on the first word probability using the language model of the first voice recognition model and the second word probability using the language model of the second voice recognition model.

Figure 4:
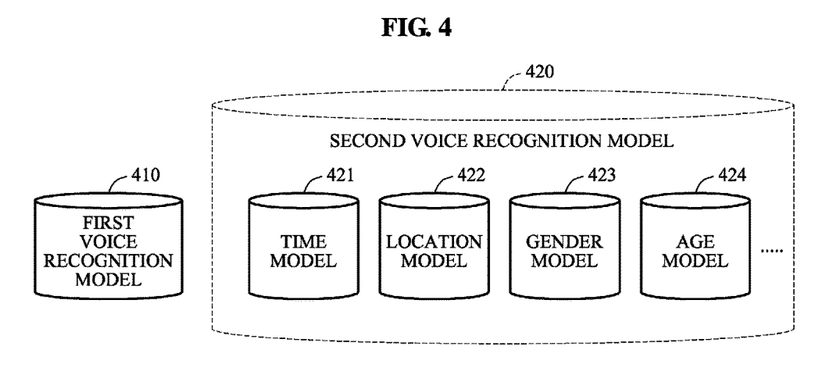
FIG. 4 is a diagram illustrating an example of a method of recognizing a word using a first voice recognition model and a second voice recognition model.

The command identifier 360 determines the presence of a user command from the recognized words of the voice signal. The voice recognition device may then execute the user command. For example, the voice recognition device may be a mobile terminal. The voice signal received by the voice recognition device may include numerous words such as "I would like that picture . . . really . . . e-mail picture twenty three to joe@gmail.com." The command identifier will identify "e-mail picture twenty three to joe@gmail.com" and send the appropriate picture through an e-mail application. FIG. 4 is a diagram illustrating an example of recognizing a word using a first voice recognition model 410 and a second voice recognition model 420.

Referring to FIG. 4, a voice recognition device performs voice recognition using the first voice recognition model 410 and the second voice recognition model 420. The second voice recognition model 420 includes various voice recognition models reflecting therein context information, for example, a time model 421, a location model 422, a gender model 423, an age model 424, a weather model, a moving speed model, a hometown model, a hobby model, and a marital status model.

In an example, the time model 421 may be a model reflecting information associated with a reception time of a voice signal. The information on the time may include, for example, general information indicating that people have an interest in weather, traffic conditions, news, and the like in the morning, work associated matters in the afternoon, and leisure in the evening. Also, the time model 421 may reflect information indicating that people have different interests on weekdays and weekends.

In another example, the time model 421 may be a model reflecting information indicating an interest on which attention is rapidly increasing at reception of a voice signal. For example, the information on the interest experiencing the rapid increase in attention may be a keyword arising in real time on a portal site and a number of hits related to an Internet news article reflecting public interest. Also, the time model 421 may be a model reflecting interest of the user expressing the voice signal. For example, the interest of the user may indicate various sets of information reflecting the interest of the user, such as an application executed by the user in the voice recognition device and a command previously input to the voice recognition device.

The location model 422 may be a model reflecting a location of the voice recognition device receiving the voice signal, and the user may set a location in the location model 422. For example, the user may set the location as a home, a company, a fitness club, and a vacation house in the location model 422. Alternatively, the location model 422 may be a model reflecting preset locations, for example, a café, a restaurant, a school, a bank, an airport, a hospital, and the like. When a location corresponding to a location verified by a position finder embedded in the voice recognition device is set in the location model 422, the voice recognition device may identify the location model 422 and set a weighted value of the location model 422 to be higher than weighted values of other voice recognition models.

The gender model 423 may be a model reflecting a gender of the user expressing the voice signal. The user may preset the gender of the user in the gender model 423. Alternatively, the voice recognition device may determine the gender of the user based on a voice signal received from the user and set a result of the determining in the gender model 423.

The age model 424 may be a model reflecting an age of the user expressing the voice signal. The user may preset the age of the user in the age model 424. Alternatively, the voice recognition device may determine the age of the user based on a voice signal received from the user and set a result of the determining in the age model 424.

The weather model may be a model reflecting the weather at the time a voice signal expressed by the user is received and information regarding the interest of the user affected by the weather. For example, in the event that the weather is clear at the time the voice signal is received, the weather model may reflect information indicating the fact that the user may be more interested in outdoor activities than in indoor activities.

The moving speed model may be a model reflecting a moving speed of the voice recognition device receiving the voice signal and information on a state of the user determined based on the moving speed. For example, in response to the user being determined to be walking based on the moving speed, the moving speed model may reflect information indicating that the user may be more interested in a location close to the voice recognition device than a remote location.

The hometown model may be a model reflecting a hometown of the user expressing the voice signal and information regarding a disposition of the user affected by the hometown of the user.

The hobby model may be a model reflecting a hobby of the user expressing the voice signal and information indicating that the user may be more interested in the hobby compared to other fields.

The marital status model may be a model reflecting a marital status of the user expressing the voice signal and information indicating that the user may be more interested in family activities rather than individual activities.

Also, the voice recognition device recognizes the word included in the voice signal by applying the first voice recognition model 410 and the second voice recognition model 420 to an n-gram language model. The n-gram language model may be a probabilistic language model, and used to estimate a word to be recognized subsequently to at least one recognized word based on the least one previously recognized word.

For example, the voice recognition device may apply the first voice recognition model 410 and the second voice recognition model 420 to the n-gram language model based on Equation 1.

$$P(w_1, \ldots, w_m) = \Sigma_{k=1}^n (\alpha_k * \Pi_{i=1}^m P_k(w_i|w_{i-(n-1)}, \ldots, w_{i-1}))$$ [Equation 1]

In Equation 1, "$w_1, \ldots, w_m$" denotes a sequence of words included in a voice signal, "$P(w_1, \ldots, w_m)$" denotes a probability of the sequence $w_1, \ldots, w_m$.

Also, "m" denotes a m-th word in the sequence of the words included in the voice signal, and "k" denotes a k-th voice recognition model in the first voice recognition model 410 and the second voice recognition model 420. For example, "k=1," "k=2," and "k=3" may denote the first voice recognition model 410, the time model 421, and location model 422. Also, "k=j" may denote a j-th model. Thus, the second voice recognition model 420 may include voice recognition models reflecting a total of "j−1" sets of context information.

Also, "$\alpha_k$" denotes a weighted value of the k-th voice recognition model, and $P_k(w_i|w_{i-(n-1)}, \ldots, w_{i-1})$ is based on the k-th voice recognition model and denotes a probability of a word desired to be recognized is "$w_i$" when previously recognized words, $w_{i-(n-1)}, \ldots, w_{i-1}$, are present prior to the word desired to be recognized.

The n-gram language model may be used to determine at least one syllable based on the acoustic model, and recognize a word or a word subsequent to the recognized word based on the language model.

Figure 5:
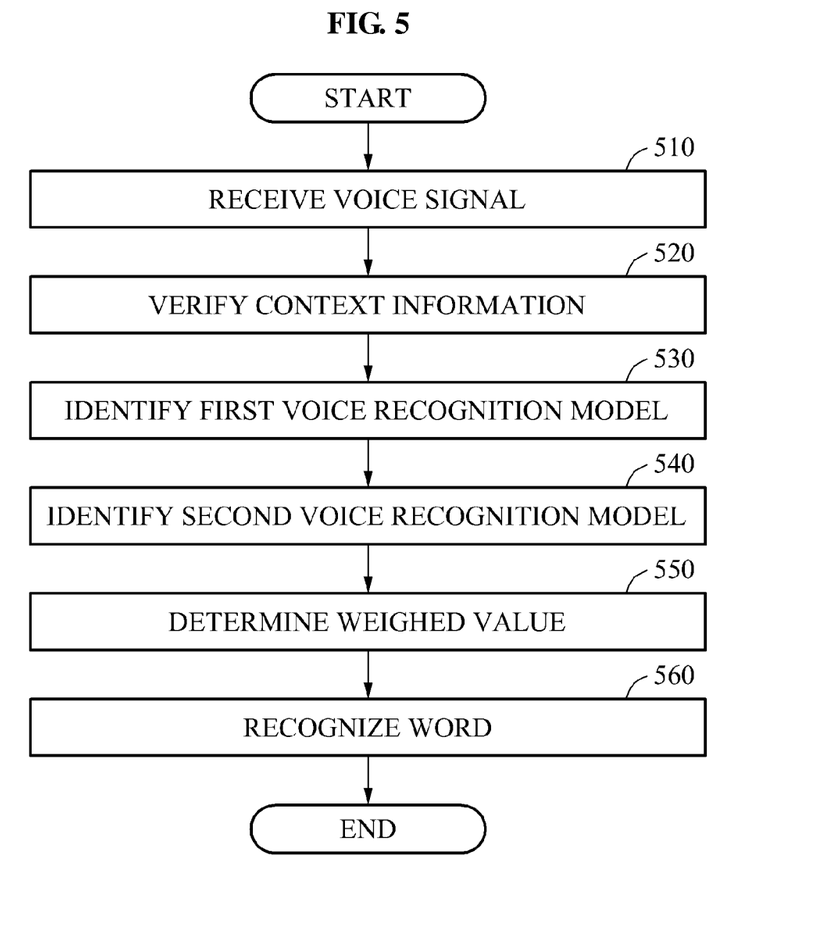
FIG. 5 is a flowchart illustrating an example of a voice recognition method.

FIG. 5 is a flowchart illustrating an example of a voice recognition method.

The voice recognition method to be described with reference to FIG. 5 may be performed by a processor included in a voice recognition device.

Referring to FIG. 5, in 510, the voice recognition device receives a voice signal. For example, the voice recognition device may receive a voice signal expressed by a user through an input device, for example, a microphone.

In 520, the voice recognition device verifies context information associated with a situation at reception of the voice signal from the user. For example, the voice recognition device may directly obtain the context information through various embedded sensors. Alternatively, the voice recognition device may obtain the context information by communicating with an additional device disposed externally.

The context information may include environmental information and user profile information. The environmental information may include various sets of information on an environment in which the user is present at reception of the voice signal. For example, the environmental information may include information regarding the time and the weather when the voice signal is received, a location of the voice recognition device when the voice signal is received, and a speed by which the voice recognition device is moving when the voice signal is received. The user profile information may include various sets of information on the user expressing the voice signal, such as the gender, age, hometown, hobby and marital status of the user.

In 530, the voice recognition device identifies a first voice recognition model. The voice recognition device identifies the first voice recognition model based on the context information. For example, in response to the context information verified in 520 being absent, the voice recognition device may identify only the first voice recognition model. The voice recognition device may not identify the first voice recognition model when the context information is significantly verified; the voice signal may be recognized using only a second voice recognition model in such an event.

In 540, the voice recognition device identifies the second voice recognition model. The voice recognition device identifies the second voice recognition model based on the context information. For example, when information on the age of the user is not verified from the context information verified in 520, the voice recognition device may not identify an age model of the second voice recognition model.

In 550, voice recognition device determines respective weighted values of the first voice recognition model and the second voice recognition model. In an example, the voice recognition device may determine the weighted values of the first voice recognition model and the second voice recognition model based on the context information verified by the context information verifier 320 of FIG. 3. In another example, in response to a portion of a received voice signal being unclear, the voice recognition device may determine a weighted value of the unclear portion, such as a word in the received voice signal, based on a weighted value of a recognized word prior to the unclearly recognized word.

In 560, voice recognition device recognizes a word based on the first voice recognition model and the second voice recognition model for which the weighted values are determined. A method of recognizing a word will be further described with reference to FIG. 6.

Figure 6:
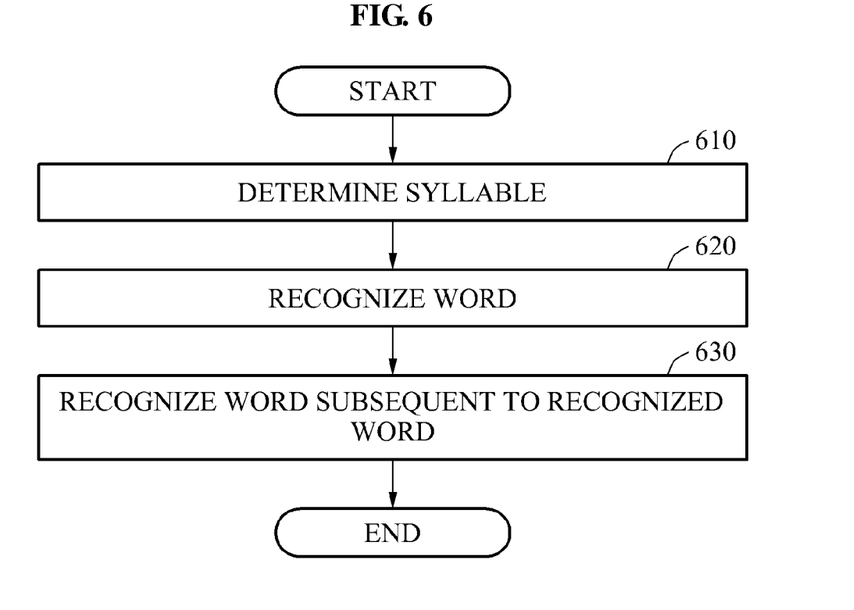
FIG. 6 is a flowchart illustrating an example of a word recognizing method.

FIG. 6 is a flowchart illustrating an example of a method of recognizing a word.

The word recognizing method to be described with reference to FIG. 6 may be performed by a processor embedded in a voice recognition device.

Referring to FIG. 6, in 610, the voice recognition device determines at least one syllable included in a voice signal by using a phoneme probability based on an acoustic model of a first voice recognition model and a phoneme probability based on an acoustic model of a second voice recognition model.

In 620, the voice recognition device recognizes a word including the at least one syllable by using a word probability based on a language model of the first voice recognition model and a word probability based on a language model of the second voice recognition model.

In 630, the voice recognition device recognizes a word subsequent to the recognized word by using a word probability based on the language model of the first voice recognition model and a word probability based on the language model of the second voice recognition model.

According to examples described herein, using a second voice recognition model in which context information is reflected may enable an improvement of accuracy in voice recognition despite a situation in which a voice signal expressed by a user may be unclear.

Further, differently setting weighted values of a first voice recognition model and the second voice recognition model may enable voice recognition more suitable for the situation of the user.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion.

The software may include a computer program, a piece of code, an instruction, or to some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of voice recognition, the method comprising:
   receiving a voice signal;
   obtaining context information associated with a situation during reception of the voice signal;
   determining, based on a level of verification of the context information, a number of voice recognition models to be used in the voice recognition;
   upon determining to use at least two voice recognition models, identifying a first voice recognition model in which the context information is not reflected and a second voice recognition model in which the context information is reflected,
   wherein the second voice recognition model comprises one or more context models, the one or more context models selected from among a plurality of context models based on the context information;
   determining a first weighted value of the first voice recognition model and a second weighted value of the second voice recognition model; and
   recognizing a word in the voice signal by using both the first weighted value applied to the first voice recognition model and the second weighted value applied to the second voice recognition model,
   wherein the first voice recognition model comprises a first acoustic model and a first language model, and
   wherein the second voice recognition model comprises a second acoustic model and a second language model.

2. The method of claim 1, wherein the one or more context models of the second voice recognition model are selected based on the context information, the context information comprising at least one of environmental information or user profile information at reception of the voice signal.

3. The method of claim 2, wherein the environmental information comprises at least one of time at reception of the voice signal, weather at reception of the voice signal, location of a voice recognition device receiving the voice signal, or a moving speed of a voice recognition device receiving the voice signal.

4. The method of claim 2, wherein the user profile information comprises at least one of a gender, an age, a hometown, a hobby, or a marital status of a user.

5. The method of claim 1, wherein
   the recognizing of the word in the voice signal comprises
   determining at least one syllable comprised in the voice signal by using a first phoneme probability based on the first acoustic model of the first voice recognition model and a second phoneme probability based on the second acoustic model of the second voice recognition model; and
   recognizing a word comprising the at least one syllable by using a first word probability based on the first language model of the first voice recognition model and a second word probability based on the second language model of the second voice recognition model.

6. The method of claim 5, wherein the recognizing of the word in the voice signal further comprises:
   recognizing a word subsequent to the recognized word by using the first word probability based on the first language model of the first voice recognition model and the second word probability based on the second language model of the second voice recognition model.

7. The method of claim 1, wherein the recognizing of the word in the voice signal is performed by applying, to an n-gram language model, the first voice recognition model and the second voice recognition model to which the first and second weighted values are applied.

8. The method of claim 1, wherein the determining of the first and second weighted values is performed based on a weighted value applied to a previous word recognized prior to the word.

9. A method of voice recognition, the method comprising:
receiving a voice signal;
verifying context information, the context information comprising at least one of environmental information or user profile information at reception of the voice signal;
determining, based on a level of verification of the context information, a number of voice recognition models to be used in the voice recognition;
upon determining to use at least two voice recognition models, determining a first weighted value of a first voice recognition model in which the context information is not reflected and a second weighted value of a second voice recognition model in which the context information is reflected,
wherein the second voice recognition model comprises one or more context models, the one or more context models selected from among a plurality of context models based on the context information; and
recognizing a word in the voice signal by using both the first weighted value applied to the first voice recognition model and the second weighted value applied to the second voice recognition model, and applying, to an n-gram language model, the first voice recognition model and the second voice recognition model to which the first and second weighted values are applied,
wherein the first voice recognition model comprises a first acoustic model and a first language model, and
wherein the second voice recognition model comprises a second acoustic model and a second language model.

10. The method of claim 9, wherein
the recognizing of the word in the voice signal comprises
determining at least one syllable comprised in the voice signal by using a first phoneme probability based on the first acoustic model of the first voice recognition model and a second phoneme probability based on the second acoustic model of the second voice recognition model; and
recognizing a word comprising the at least one syllable by using a first word probability based on the first language model of the first voice recognition model and a second word probability based on the second language model of the second voice recognition model.

11. The method of claim 10, wherein the recognizing of the word in the voice signal further comprises:
recognizing a word subsequent to the recognized word by using the first word probability based on the first language model of the first voice recognition model and the second word probability based on the second language model of the second voice recognition model.

12. A non-transitory computer-readable storage medium comprising a program comprising instructions to cause a computer to perform the method of claim 1.

13. A voice recognition device, the device comprising:
a receiver configured to receive a voice signal;
a processor configured to
obtain content information associated with a situation during reception of the voice signal,
determine, based on a level of verification of the context information, a number of voice recognition models to be used in voice recognition,
upon determining to use at least two voice recognition models, identify a first voice recognition model in which the context information is not reflected and a second voice recognition model in which the context information is reflected,
wherein the second voice recognition model comprises one or more context models, the one or more context models selected from among a plurality of context models based on the context information,
determine a first weighted value of the first voice recognition model and a second weighted value of the second voice recognition model, and
recognize a word in the voice signal by using both the first weighted value applied to the first voice recognition model and the second weighted value applied to the second voice recognition model,
wherein the first voice recognition model comprises a first acoustic model and a first language model, and
wherein the second voice recognition model comprises a second acoustic model and a second language model.

14. The device of claim 13, wherein the processor is further configured to select the one or more context models of the second voice recognition model based on the context information, the context information comprising at least one of environmental information or user profile information at reception of the voice signal.

15. The device of claim 14, wherein the environmental information comprises at least one of time at reception of the voice signal, weather at reception of the voice signal, location of the voice recognition device receiving the voice signal, or a moving speed of the voice recognition device receiving the voice signal.

16. The device of claim 14, wherein the user profile information comprises at least one of a gender, an age, a hometown, a hobby, or a marital status of a user.

17. The device of claim 13, wherein
the processor is further configured to
determine at least one syllable comprised in the voice signal by using a first phoneme probability based on the first acoustic model of the first voice recognition model and a second phoneme probability based on the second acoustic model of the second voice recognition model, and
recognize a word comprising the at least one syllable by using a first word probability based on the first language model of the first voice recognition model and a second word probability based on the second language model of the second voice recognition model.

18. The device of claim 17, wherein the processor is configured to further recognize a word subsequent to the recognized word by using the first word probability based on the first language model of the first voice recognition model and the second word probability based on the second language model of the second voice recognition model.

19. The device of claim 13, wherein the processor is further configured to recognize the word in the voice signal by applying, to an n-gram language model, the first voice recognition model and the second voice recognition model to which the first and second weighted values are applied.

20. The device of claim 13, wherein the processor is further configured to determine the first and second weighted values of the first voice recognition model and the second voice recognition model based on a weighted value applied to a previous word recognized prior to the word.

21. A device for voice recognition, the device comprising:
a microphone configured to receive a voice signal;
a processor configured to
- recognize a word in the voice signal by applying weighted values to candidate words, the weighted values obtained by determining context information of the device at the time the voice signal is received; and
- identify a user command based on the recognized word, wherein the processor is further configured to
- determine, based on a level of verification of the context information, a number of voice recognition models to be used in the voice recognition, and
- upon determining to use at least two voice recognition models, recognize the word using both a first voice recognition model in which the context information is not reflected and a second voice recognition model in which the context information is reflected, wherein the second voice recognition model comprises one or more context models, the one or more context models selected from among a plurality of context models based on the context information, wherein the first voice recognition model comprises a first acoustic model and a first language model, and wherein the second voice recognition model comprises a second acoustic model and a second language model.

22. The device of claim 21, wherein the processor is further configured to:
- determine a first weighted value of the first voice recognition model and a second weighted value of the second voice recognition model, and
- recognize the word in the voice signal by using both the first weighted value applied to the first voice recognition model and the second weighted value applied to the second voice recognition model.

* * * * *